(12) United States Patent
Yamaki

(10) Patent No.: US 6,929,763 B2
(45) Date of Patent: Aug. 16, 2005

(54) INJECTION MOLDING METHOD

(75) Inventor: Hiroshi Yamaki, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 409 days.

(21) Appl. No.: 10/048,529

(22) PCT Filed: May 31, 2001

(86) PCT No.: PCT/JP01/04622
§ 371 (c)(1), (2), (4) Date: Jan. 31, 2002

(87) PCT Pub. No.: WO01/91987
PCT Pub. Date: Dec. 6, 2001

(65) Prior Publication Data
US 2003/0011090 A1 Jan. 16, 2003

(30) Foreign Application Priority Data
May 31, 2000 (JP) ........................................ 2000-161640

(51) Int. Cl.⁷ .......................... B29C 45/60; B29C 45/76; B29C 44/36; B29C 44/60
(52) U.S. Cl. .......................... 264/40.3; 264/50; 264/51; 264/328.17; 425/4 R; 425/146; 425/208
(58) Field of Search .......................... 264/40.3, 50, 51, 264/54, 500, 328.1, 328.17, 328.19; 366/101–107; 425/4 R, 4 C, 146, 208, 563

(56) References Cited

U.S. PATENT DOCUMENTS

| 3,787,542 | A | * | 1/1974 | Gallagher et al. | ............. 264/51 |
| 3,856,442 | A | * | 12/1974 | Gallagher et al. | ............ 425/4 C |
| 3,981,649 | A | * | 9/1976 | Shimano et al. | ............. 425/4 C |
| 3,986,709 | A | * | 10/1976 | Vermeulen | .................... 366/90 |
| 4,043,715 | A | * | 8/1977 | Hendry | ........................ 425/4 R |
| 4,134,714 | A | * | 1/1979 | Driskill | ....................... 425/113 |
| 4,185,060 | A | * | 1/1980 | Ladney, Jr. | ................... 264/54 |
| 4,211,523 | A | * | 7/1980 | Hunerberg | ..................... 425/4 C |
| 4,733,970 | A | * | 3/1988 | Yokana | ......................... 366/79 |
| 5,098,267 | A | * | 3/1992 | Cheng | ........................... 425/4 R |
| 5,334,356 | A | | 8/1994 | Baldwin et al. | |
| 6,602,063 | B1 | * | 8/2003 | Cardona | ...................... 425/4 R |

FOREIGN PATENT DOCUMENTS

| JP | 4-20467 Y2 | 7/1979 |
| JP | 63-57213 B2 | 11/1988 |
| JP | 9-323338 A | 12/1997 |
| JP | 11-34130 A | 2/1999 |
| JP | 2000-141435 A | 5/2000 |
| JP | 2001-113556 A | 4/2001 |
| WO | 98/52734 A1 | 11/1998 |

* cited by examiner

Primary Examiner—Angela Ortiz
(74) Attorney, Agent, or Firm—Birch, Stewart, Kolasch & Birch, LLP

(57) ABSTRACT

The invention provides an injection molding method comprising supplying a gas into a molten resin in a plasticizing cylinder and injecting the molten resin having the gas dissolved therein, wherein when the resin is being plasticized, a gas space with a predetermined gas pressure is formed within the plasticizing cylinder in a gas supply section and the pressure at the front end of the screw is adjusted to be at least equal to the gas pressure in the gas space and within a range where the gas space can be maintained within the plasticizing cylinder in the gas supply section. According to the invention, the necessary amount of gas can be dissolved in the molten resin with good reproducibility in a quantitative manner.

15 Claims, 11 Drawing Sheets

INJECTION MOLDING METHOD

This application is the national phase under 35 U.S.C. § 371 of PCT International Application No. PCT/JP01/04622 which has an International filing date of May 31, 2001, which designated the United States of America.

TECHNICAL FIELD

This invention relates to a method of injection molding a thermoplastic resin, more particularly, to a method of injection molding comprising injecting a molten resin having a gas dissolved therein in order to enhance the flowability of the molten resin upon being molded or to obtain a foamed molded article.

BACKGROUND ART

The demand for smaller thickness and lighter weight is not limited to the housings of mobile electronic devices such as portable computers and cell phones and it has recently become intensive in the field of general electronic devices. In particular, the chassis and the internal mechanistic parts of a copying machine and the like are required to have not only high dimensional precision and various kinds of strength associated with handling but also reduction in thickness and weight. As a result, injection moldings are needed that desirably have nonuniform sections, i.e., the portions that do not require strength are made thin and lightweight whereas the portions that require strength are made thick, and which still have good dimensional precision. In other words, it is required to meet both requirements for strength and lightweight by providing a design in which the portions that require strength are reinforced with thick ribs whereas the portions that do not require strength are made as thin as possible. Under these circumstances, a molding method is needed by which even the portions that are thin-walled and have long flow distances can be adequately filled with a resin during molding.

In order to ensure that even the portions that are thin-walled and have long flow distances can be adequately filled with a resin, one may enhance the flowability of the resin. In injection molding of thermoplastic resins, the flowability of a molten resin determines not only the ease in filling the mold cavity but also the probability that after filling the cavity, sufficient pressure is transmitted to its interior, particularly to the resin which forms the thin-walled portions at the end of resin flowing; hence, the flowability of a molten resin also affects the dimensional precision of moldings and is an important factor that determines the processability of resins.

One index of flowability is the viscosity of molten resin. Thermoplastic resins have high melt viscosity and are poor in flowability as molding materials. Hence, in the case of thin-walled parts, incomplete resin filling often occurs.

In order to lower the viscosity of molten resin and thereby improve the flowability, it is effective to increase the molding temperature; however, in the case of a resin for which the molding temperature is close to its decomposition temperature or a resin incorporating additives such as less heat-stable flame retardants, the resin itself or the additives may undergo thermal decomposition and problems are likely to occur as exemplified by the decrease in the strength of moldings, the formation of foreign matter due to the deteriorated resin, the staining of the mold and discoloration. Yet another problem is delayed cooling of the resin in the mold which contributes to prolonging the molding cycle time.

The following methods are conventionally known to be capable of improving the flowability of molten resin without increasing the molding temperature.

(1) Method of reducing the molecular weight of the resin by lowering its average molecular weight or broadening the molecular weight distribution, particularly by increasing the low-molecular weight component.

(2) Method of introducing a comonomer into the molecule.

(3) Method of adding a low-molecular weight oily substance such as mineral oil or a plasticizer such as a higher aliphatic acid ester.

(4) Method of dissolving carbon dioxide which acts as a plasticizer.

To further describe method (4), reference may be had to WO 98/52734 which teaches that carbon dioxide dissolved in a resin works as a plasticizer for the resin to lower its glass transition temperature.

It is known to produce foamed molded articles using molten resins having a gas such as carbon dioxide dissolved therein. For example, the specification of U.S. Pat. No. 5,334,356 discloses a method in which carbon dioxide used as a blowing agent is supplied into a molten resin as it flows part of the way through an extruder, thereby molding a fine and highly expanded microcellular foam. The official gazettes of Japanese Patent Publication No. 57213/1988 and Japanese Patent Laid-Open No. 34130/1999 have descriptions of an injection molding machine for foam molding using a gas and according to their teachings, a blowing gas is supplied at a site which is part of the way through an extruder and a mechanism for preventing resin back-flow of a is provided in both the first and second stages of the screw and, optionally, also at the gas supply valve.

However, method (1) mentioned above lowers impact strength and chemical resistance although it increases flowability; method (2) lowers hot rigidity; and method (3) has problems such as the plasticizer lowering hot rigidity or being deposited on the mold to stain it during molding. Method (4) has the advantage of not causing the problems encountered in methods (1)–(3), however, the desired improvement in flowability is difficult to achieve if an insufficient amount of carbon dioxide is dissolved in the molten resin.

The following two methods may be employed to dissolve gases such as carbon dioxide in the resin. In the first method, a resin in particulate or powder form is preliminarily placed in a carbon dioxide atmosphere and supplied into the molding machine after it has been allowed to absorb carbon dioxide. The amount of carbon dioxide absorption is determined by the pressure of carbon dioxide, the temperature of the carbon dioxide atmosphere and the time for which carbon dioxide is absorbed. In the other method, carbon dioxide is supplied and dissolved in the plasticized resin in the cylinder of the molding machine.

To supply a gas such as carbon dioxide into molten resin in the commonly used in-line screw type and screw pre-plunger type injection molding machines in which the screw rotates intermittently, the gas supply pump has to be operated in accordance with the amount of resin transfer which varies with time as the screw stops or starts rotating, so it is difficult to ensure that the amount of the gas dissolved in the resin is controlled at constant level.

The present invention has been accomplished in the light of the aforementioned conventional problems. Accordingly, an object of the present invention is to provide an injection molding method which comprises supplying a gas into a plasticizing cylinder and injecting a molten resin having the gas dissolved therein, and in which a quantitative and economically required volume of a gas such as carbon dioxide can be dissolved in the molten resin even if the screw rotates intermittently in the plasticizing cylinder.

DISCLOSURE OF THE INVENTION

The present invention provides an injection molding method comprising supplying a gas into a molten resin in a plasticizing cylinder and injecting the molten resin having the gas dissolved therein, characterized in that when the resin is being plasticized, a gas space with a predetermined gas pressure is formed within the plasticizing cylinder in a gas supply section and the pressure at the front end of the screw is adjusted to be at least equal to the gas pressure in the gas space and within a range where the gas space can be maintained within the plasticizing cylinder in the gas supply section.

The above-described injection molding method of the invention include preferred embodiments as follows:

The gas pressure in the gas space formed in the gas supply section is detected and the pressure at the front end of the screw is controlled on the basis of this gas pressure;

The molten resin is transferred in a starved state within the gas supply section;

The pressure at the front end of the screw exerted during plasticization is also retained during the screw shutdown period from the end of plasticization to the start of injection;

The gas is carbon dioxide;

The plasticizing cylinder is equipped with a multi-stage type screw in which a stage comprising, in the following order from the resin supply section side toward the front end side of the screw, a feed section, a compression section and a metering section is repeated a plurality of times in series, and the gas supply section is located within the feed section of the front end side screw stage;

Notches are formed in the screw flights in the feed section of the front end side screw stage, and the gas and the molten resin are kneaded while part of the molten resin is caused to flow backward by means of said notches;

A flow control section presenting high resistance to the flow of the molten resin is provided in the metering section of the rear end side screw stage of the plasticizing cylinder;

The plasticizing cylinder is equipped with a mechanism for preventing the back-flow of the molten resin in the metering section of the rear end side screw stage;

The gas supply into the plasticizing cylinder in the gas supply section is effected via an automatic on-off valve which is opened and closed automatically by the pressure difference between the supply pressure and the pressure within the cylinder in the gas supply section; and An in-line screw type injection molding machine is used that is equipped with a valve nozzle having a closable injection port and a mechanism provided at the front end of the screw to prevent back-flow of the molten resin, wherein the screw is rotated with the injection port being closed, and as soon as a predetermined amount of the molten resin with dissolved carbon dioxide is accumulated in the front part of the plasticizing cylinder, the resin back-flow preventing mechanism in the front end portion of the screw is brought to closure with the back pressure of the screw being maintained near the position where the screw completes metering, and then the injection port is opened to inject the molten resin.

The present invention also provides an injection molding apparatus which comprises a plasticizing cylinder and a gas supply device for supplying a gas into a molten resin in the plasticizing cylinder and which injects the molten resin having the gas dissolved therein, wherein said plasticizing cylinder has a multi-stage type screw in which a stage comprising, in the following order from the rear end side toward the front end side in the direction of injection, a feed section, a compression section and a metering section is repeated a plurality of times in series, and which is also equipped with a gas supply channel open to the feed section of the front end side screw stage, and wherein said supply device is connected to the gas supply channel.

The injection molding apparatus of the invention include preferred embodiments as follows:

The apparatus has a pressure sensor for detecting the pressure of the gas supplied into the plasticizing cylinder via the gas supply channel and a control unit for controlling the pressure at the front end of the screw on the basis of the pressure as detected with this sensor;

The apparatus has an automatic on-off valve, which is pressed by a spring onto a valve seat provided on the perimeter of an opening in the gas supply channel that extends into the plasticizing cylinder and which, when gas is supplied into the gas supply channel, is pressed against the spring by the pressure difference between the supply pressure and the pressure within the cylinder in the gas supply section and moved into the plasticizing cylinder to open the gas supply channel;

The screw flights in the feed section of the front end side screw stage contain notches; and A flow control section presenting high resistance to the flow of the molten resin is provided in the metering section of the rear end side screw stage.

Figure 1:
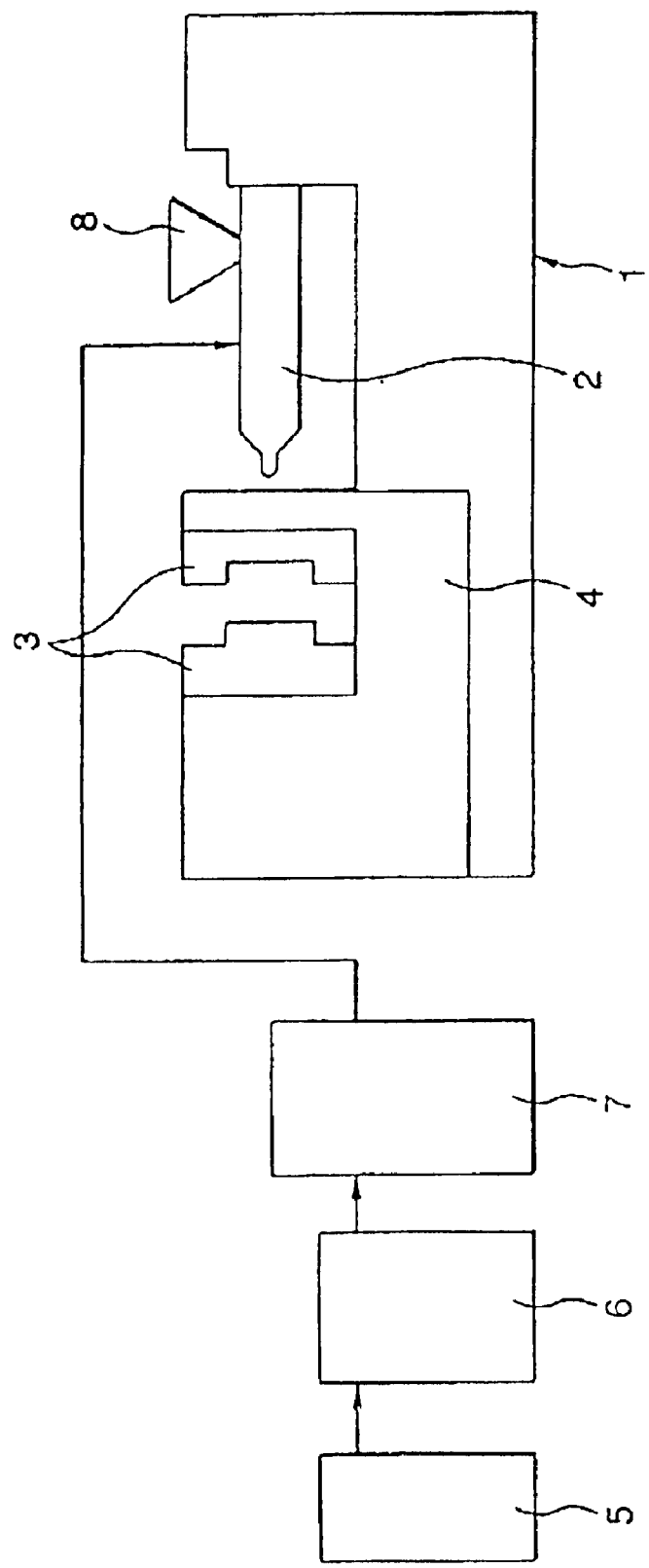
FIG. 1 is a schematic diagram of an injection molding apparatus suitable for the injection molding method of the invention.

In the drawings, respective numerals represent the following: 1, injection molding machine; 2, plasticizing cylinder; 3, mold; 4, mold clamping device; 5, carbon dioxide source; 6, carbon dioxide booster; 7, carbon dioxide pressure control; 8, hopper; 9, liquefied carbon dioxide container; 10, electromagnetic on-off valve; 11, liquefied carbon dioxide compressor; 12, electromagnetic on-off valve; 13, heater; 14, reducing valve; 15, main tank; 16, relief valve; 17, meter; 18, gas supply pipe; 19, electromagnetic on-off valve; 20, check valve; 21, relief valve; 22, valve open to the atmosphere; 23, screw; 23a, first stage of the screw; 23b, second stage of the screw; 24, nozzle portion; 25, resin metering device; 26, gas supply section; 27, gas supply channel; 28, flow control section; 29, automatic on-off valve; 30, spring; 31, valve seat; 32, valve shaft; 33, back-flow preventing ring; 34, nozzle hole; 35, needle valve; 36, drive unit; 37, drive rod; 40, back-flow preventing mechanism; 41, first feed section; 42, first compression section; 43, first metering section; 44, second feed section; 45, second compression section; 46, second metering section; 50, notch; 60, small-diameter portion; 61, resin flow channel portion; 62, check ring; 63, spring.

BEST MODE FOR CARRYING OUT THE INVENTION

The resins to be used in the injection molding method of the invention are thermoplastic resins and specific examples include polyethylene, polypropylene, poly(vinyl chloride), acrylic resins, styrenic resins, poly(ethylene terephthalate), poly(butylene terephthalate), polyallylates, poly(phenylene ether), modified poly(phenylene ether) resins, wholly aromatic polyesters, polyacetals, polycarbonates, amorphous polyolefinic resins, polyetherimide, polyethersulfone, polyamide-based resins, polysulfones, polyetheretherketone, and polyetherketone. These may be used either alone or as a blend of two or more species They may also be used in the presence of various incorporated fillers and additives.

Styrenic resins among the above-listed thermoplastic resins are homopolymers and copolymers that use styrene as an essential ingredient, as well as polymer blends prepared from these polymers and other resins; polystyrene and ABS resin are preferred. Polystyrene is a styrene homopolymer or a rubber-reinforced polystyrene having rubber distributed in the resin phase.

If carbon dioxide is to be used as gas, preferred thermoplastic resins are those which have high enough affinity for carbon dioxide to be dissolved in large amount, as well as those which can be effectively plasticized with carbon dioxide; particularly preferred are polyethylene, polypropylene, styrenic resins, polyacetals, polycarbonates, poly(phenylene ether) and modified poly(phenylene ether) resins. In particular, polycarbonates not only permit carbon dioxide to be dissolved in large amount, they also generate carbon dioxide when decomposed thermally; hence, the inclusion of carbon dioxide in the molten resin offers the added advantage of shifting the equilibrium of the decomposition reaction to slow down its rate.

The injection molding method of the invention is applicable to the production of general injection moldings and can be used to produce not only foamed molded articles but also solid shapes having no cells in the interior. The molten resin having gas dissolved therein has a tendency to expand, so in order to prevent the development of a foam pattern on the surface of the molding, the injection molding method of the invention may be combined with the counterpressure method in which the mold cavity is preliminarily pressurized with gas before it is filled with the molten resin so that no foaming occurs in the flow front of the molten resin during cavity filling.

The gas to be used in the injection molding method of the invention may be exemplified by nitrogen which is commonly used as a blowing gas, inert gases typified by rare gases such as helium and argon, carbon dioxide which is highly soluble in thermoplastic resins and exhibits a satisfactory plasticizer effect, Freons comprising $C_1$–$C_5$ saturated hydrocarbons in which some hydrogen atoms are replaced by fluorine, and the vapors of liquids such as water and alcohols.

If gas is to be dissolved in order to enhance the flowability of molten resin, carbon dioxide is the most preferred gas. Carbon dioxide has high solubility in molten resin and meets various requirements such as no deterioration of the resin, mold and the constituent material of the molding machine, no hazard to the environment in which molding is performed, and low cost; in addition, if carbon dioxide is used as a plasticizer, it can be rapidly evaporated away from the molded article after molding. If gas is used as a blowing agent, nitrogen having high blowing action is preferred.

If carbon dioxide is used as a plasticizer in the injection molding method of the invention, it is preferably dissolved in the molten resin in an amount of at least 0.2 wt %. There is no particular limitation on the maximum amount by which carbon dioxide can be dissolved; however, high gas pressure is needed in order to dissolve a large amount of carbon dioxide and an undue increase in the amount of dissolution simply reduces the effectiveness of carbon dioxide in improving the flowability of the resin; hence, a practical amount of carbon dioxide that may be dissolved is 10 wt % or less, more preferably 5 wt % or less.

In this connection, the amount of gas such as carbon dioxide that has dissolved within the plasticizing cylinder is difficult to measure directly, so the difference between the weight of a molded article measured immediately after injection molding of a carbon dioxide containing resin and the weight of the molded article measured after leaving it to stand for at least 24 hours in a hot-air dryer at a temperature about 30° C. lower than the glass transition temperature of the resin if it is amorphous or the melting point of the resin if it is crystalline, until the amount of the carbon dioxide contained in the molded article has leveled off as a result of dissipation is defined as the amount of the carbon dioxide in the molten resin injected into the mold cavity.

The injection molding machine to be used in the injection molding method of the invention is exemplified by the in-line screw type injection molding machine and the screw preplunger type injection molding machine which are commonly used in injection molding and in which the screw rotates intermittently to plasticate the resin. In the in-line screw type injection molding machine, the screw also serves as an injection plunger and with the progress of resin plasticization, the screw retracts to shorten the effective screw length. In the screw preplunger type injection molding machine, the resin-plasticizing extruder portion is separate from the injection plunger, so the extruder portion can be regarded as a pure extruder. Hence, the screw preplunger type injection molding machine has fewer limiting factors in screw design and not only is it possible to increase L/D and decrease the root diameter, there is also the advantage of providing ease in keeping gas to be supplied at an optimum position.

In the injection molding method of the invention, gas is supplied into the plasticizing cylinder and dissolved in the molten resin in the plasticizing cylinder. The molten resin with the gas dissolved therein has a tendency to expand, so in order to ensure that the pressure in the plasticizing cylinder will not escape from the nozzle portion of the injection molding machine and that the molten resin with the dissolved gas will not expand in the plasticizing cylinder, preparations for injection are made with care being taken to prevent the internal pressure from escaping from the nozzle portion. To prevent the internal pressure from escaping from the nozzle portion, the plasticizing cylinder may have a valve nozzle equipped with a mechanism for opening and closing the nozzle hole. This mechanism may be exemplified by a moving needle that opens or closes the nozzle hole or a rotary valve provided in the resin flow channel; a preferred structure opens or closes near the nozzle hole in order to prevent drooling. If an injection molding machine having no valve nozzle is to be used, the escape of the internal pressure can be prevented by using a mold having a hot runner of the valve gate type, with the nozzle portion being pressed onto the mold and the valve gate closed.

In order to dissolve gas in molten resin in the injection molding method of the invention, gas may be supplied into the molten resin portion in the plasticizing cylinder so as to form a gas space of a predetermined gas pressure within the plasticizing cylinder in the gas supply section. The amount of the gas dissolved in the molten resin varies with the kind of gas, the kind of resin, the temperature of the molten resin, the rotating speed of the screw, the pressure at the front end of the screw, the durations of time for which the screw rotates and remains at rest, etc. but if these conditions are constant, the pressure of the gas in contact with the molten resin is substantially proportional to the amount of the gas dissolved in the molten resin. Therefore, the amount of gas dissolution can be controlled with good reproducibility by forming a gas space in contact with the molten resin and keeping the gas pressure in this gas space at a predetermined level.

In order to ensure that the above-mentioned gas space is formed positively, the molten resin is preferably transferred in a starved state through the gas supply section. By the expression "the molten resin is transferred in a starved state", we mean that the molten resin being transferred does not completely fill the plasticizing cylinder but leaves a partial empty space. In a preferred case, a plasticizing cylinder of a 2-stage type screw is used, with the first stage of the screw comprising, from the rear end side (hopper side), a feed section, a compression section and a metering section, and the second stage of the screw having the same construction, and the resin is melted in the first stage of the screw whereas the feed section of the second stage is used as the gas supply section through which the molten resin is transferred in a starved state, thereby creating an empty space in the plasticizing cylinder and gas is supplied into this empty space so that it is kneaded with the resin in the second stage of the screw and dissolved in the resin.

The most convenient way to ensure that the molten resin is transferred in a starved state through the gas supply section is by providing a flow control section presenting high resistance to the molten resin in the area between the metering section of the first stage of the screw and the vent portion of the second stage of the screw, thereby limiting the ingress of the molten resin into the second stage of the screw. Means for providing the flow control section that presents high resistance to the molten resin include decreasing the channel depth of the screw, special designs for kneading such as Dulmage and Madock, and a simple cylindrical barrier having a clearance of only about 0.1–1 mm, preferably 0.1–0.5 mm, from the cylinder.

The above-mentioned flow control section is preferably combined with the practice of transferring more of the molten resin through the second stage of the screw than through the first stage per rotation of the screw. A specific technique may be by adopting greater channel pitches and depths in the second stage of the screw than in the first stage. In this case, the feed section of the second stage (the second feed section) may have a multi-flight (e.g. double flight) screw to reduce the distance between flights; as a result, the pitch can be set at a sufficiently large value to increase the amount of resin transfer; in addition, even if the molten resin is transferred in a starved state, the occurrence of its retention in the screw channels is seldom enough to prevent the resin from being deteriorated due to its retention. Another technique that can be combined is by equipping the hopper with a device for metering the resin supply and creating a starved state by controlling the amount of resin supply into the first stage of the screw.

In addition to the above-described injection of gas in a starved state, the molten resin is preferably kneaded with the gas as part of it is allowed to flow backward on the condition that the starved state is maintained within the second feed section. By allowing part of the molten resin to flow backward, the gas injected into the molten resin can be brought into contact with a sufficiently increased area of the molten resin to promote its dissolution in the molten resin. In addition, mixing of the portions of molten resin before and after gas injection is sufficiently promoted to suppress uneven dissolution of the gas in the feed direction of the molten resin.

Part of the molten resin can be caused to flow backward in the above second feed section by forming notches in the screw flights in the second feed section. By ensuring that the screw in the second feed section provides a sufficiently large transport, the above-mentioned starved state can be maintained despite this back-flow of the molten resin. A kneading effect comparable to that of the back-flow of part of the molten resin in the second feed section can also be obtained by, for example, erecting kneading pins in the second feed section.

If notches for causing part of the molten resin to flow backward are to be provided in the screw flights in the second feed section to promote the dissolution of a gas in the molten resin, the total area of the notches preferably accounts for $1/50$–$1/2$ of the total area of the screw flights in the second feed section, with those notches being distributed over the screw flights in the second feed section. Note that the area of each notch and that of each screw flight are the area of projection in the direction of the central axis of the screw.

When the pressure gradient of the resin in the first stage of the screw decreases as when the screw stops rotating, the gas supplied in the gas supply section may pass through the resin in the first stage of the screw to blow out into the hopper and the flow control section is also effective in preventing this phenomenon. In order to prevent gas blow-out into the hopper, a moving back-flow preventing mechanism of the same type as commonly used in screw heads can be employed and this may well be called a more positive way. Since the function of the back-flow preventing mechanism is to prevent the blowout of gas into the hopper by sealing resin of a comparatively low pressure, it does not need to have a rugged construction and a check ball, a moving ring, a lead valve or a shutter in the form of a spur gear with a limited range of rotation angles can be used; a preferred design is such that as soon as the plasticization process ends, the back-flow preventing mechanism is actuated automatically as by a spring or reverse rotation of the screw.

While the foregoing description assumes the 2-stage type screw, screws consisting of three or more stages may be used to achieve the same effect if the feed section of the front end side screw stage is used as the gas supply section and the flow control section is provided in the metering section of the subsequent screw stage so that gas can be supplied in an empty space created in the gas supply section. Connecting a plurality of 1-stage screw extruders is also equivalent to an extruder having a screw of 2 or more stages.

In order for the injection molding method of the invention to have the molten resin transferred in a consistently starved state through the gas supply section so that gas is dissolved homogeneously in the molten resin, it is necessary that the pressure at the front end of the screw is at least equal to the gas pressure in the aforementioned gas space and within a range where the gas space can be maintained within the plasticizing cylinder in the gas supply section. If the pressure at the front end of the screw is unduly low, the gas supplied into the gas supply section may not be completely dissolved in the molten resin but may partly remain in bubble form so that metering of the molten resin becomes variable or voids occur in the molding; in the latter case, the gas within the voids will expand when the mold is opened and this in turn expands the molding. The pressure at the front end of the screw is the pressure of the molten resin at the front end of the screw and this is equal to the back pressure of the screw which pushes the screw or the injection plunger in the direction of injection.

To set the lower limit of the pressure at the front end of the screw, the following two methods may be employed. One of them is a convenient method in which the gas pressure within the gas space in the gas supply section is set to be equal to the pressure at the front end of the screw. In the other method, the lower limit is associated with the plasticization of resin and set to a pressure where the rotation of the screw is proportional to the amount of the plasticized resin; in other words, a minimum pressure at which the screw or the injection plunger retracts at a constant speed given a constant rotating speed of the screw is set as the lower limit.

The first method can be easily effected by providing the plasticizing cylinder with a pressure sensor which detects the gas pressure within the gas space formed in the gas supply section and by also providing a control unit which controls the pressure at the front end of the screw on the basis of the pressure detected with this pressure sensor. In this case, the pressure at the front end of the screw can be controlled to become either equal to the pressure in the gas space or greater than it by a predetermined amount. The second method is based on the fact that when the gas supplied into the gas supply section partly mixes with the molten resin in bubble form, the apparent amount of molten resin being fed by the screw, namely, the sum of the volumes of the molten resin and the bubbles, increases temporarily, causing the retracting speed of the screw or the injection plunger to increase abruptly.

If the pressure at the front end of the screw is unduly high, the plasticization of resin slows down and, what is more, if the aforementioned 2-stage type screw is used, the molten resin cannot be fed through the second stage of the screw against the high pressure at the front end of the screw and the pressure of the molten resin in the gas supply section increases so much that no gas space can exist. In such a state, it is not only impossible to dissolve an adequate amount of gas in the molten resin but it is also difficult to control the amount of gas being dissolved in the molten resin. The upper limit of the pressure at the front end of the screw is a pressure at which when the resin is plasticized without gas supply, the pressure of the molten resin in the gas supply section becomes equal to the gas supply pressure. If the pressure of the molten resin at the front end of the screw is less than this upper limit, a gas space can exist in the gas supply section and the necessary amount of gas can be dissolved in the molten resin while controlling the amount of its dissolution.

However, in a situation where the gas supply section is filled with a super atmospheric molten resin in the absence of gas supply, a gas space can be formed by supplying the gas supply section with a gas having a higher pressure than the molten resin but if the pressure of the molten resin varies, the pressure in the gas space also changes and the amount of the gas dissolved in the molten resin will eventually vary. To avoid this problem, it is preferred that the transfer of the molten resin through the gas supply section is always held in a starved state, irrespective of gas supply, thereby ensuring that the pressure of the molten resin in the gas supply section is kept subatmospheric. In this case, the gas space in the gas supply section will not be compressed by the molten resin and the amount of gas to be dissolved in the molten resin can be controlled by the pressure of gas being supplied into the gas supply section.

In the present invention, the absolute value of the pressure at the front end of the screw (back pressure of the screw) varies with the size of screw, its design, its rotating speed, the kind of resin, its temperature, the pressure of gas to be supplied, etc. but it is at least equal to the pressure of gas to be supplied into the gas supply section and selected within a range where the pressure of the molten resin in the gas supply section is less than the pressure of gas being supplied into the gas supply section.

The molten resin with dissolved gas has a tendency to expand, so in order to suppress the occurrence of foaming during shutdown of the screw after the end of plasticization until injection starts, the above-described pressure at the front end of the screw is desirably retained. The pressure to be retained at the front end of the screw may be equal to the pressure at the front end of the screw that is applied during resin plasticization and may be a minimum pressure at which the screw or plunger will not retract upon expansion of the molten resin. If the pressure at the front end of the screw which is to be retained after the end of plasticization until injection starts is unduly high, the screw or plunger will have advanced before the injection process starts, causing an error in the amount of molten resin that was metered during plasticization. Even in the case of suspending the molding process for a short time, the pressure at the front end of the screw is preferably retained at a non-screw or plunger retracting level in order to prevent foaming of the residual molten resin in the plasticizing cylinder.

A technique by which the pressure at the front end of the screw can be maintained constant during shutdown of the screw is one of maintaining a constant force for advancing the screw and in the case where the screw is advanced by hydraulic drive, this can be accomplished by maintaining the screw advancing hydraulic force constant. In this case of hydraulic drive, the desired effect can also be obtained by closing a screw advancing hydraulic valve during screw shutdown to cut the flow of a working oil countering the pressure at the front end of the screw, thus locking the screw against retraction.

Control may also be effected to maintain the position of the screw or plunger constant and this is suitable for the case where the screw is advanced by drive with an electric motor.

The supply of gas into the plasticizing cylinder in the gas supply section is preferably effected via an automatic on-off valve that is opened and closed automatically by the pressure difference between the supply pressure and the pressure within the cylinder in the gas supply section.

Specific examples of such automatic on-off valve include a mushroom valve (a valve body in the form of a frustum, typically a frustum of a cone) that is provided at the distal end of a gas supply channel open to the interior of the plasticizing cylinder in the gas supply section such that it is urged by a spring in a direction where it makes intimate contact with the valve seat and which, when pushed by the pressure of gas being supplied, counters the spring and moves into the plasticizing cylinder to open the gas supply channel. If such a mushroom valve is used, the gas supply channel is opened in a gas supply mode in accordance with the gas flow to provide a comparatively large area of opening and, hence, the necessary amount of gas can be supplied within a short time. On the other hand, when there is no gas flow, the gas supply channel is closed automatically, so the molten resin will not flow backward into the gas supply channel. Furthermore, even in the case where gas is flowing, any part of the molten resin that is about to get into the gas supply channel will push the bottom of the mushroom valve until it becomes closed automatically, whereby the molten resin can be prevented from flowing backward.

In the next place, an example of the apparatus to be used for the injection molding method of the invention is described with reference to the accompanying drawings. The apparatus of this example uses an in-line screw type injection molding machine and carbon dioxide as a gas.

In FIG. 1, numeral 1 designates an injection molding machine which is furnished with a plasticizing cylinder 2 which plasticates and injects a thermoplastic resin, a mold 3 and a mold clamping device 4. The plasticizing cylinder 2 in the injection molding machine 1 is supplied with carbon dioxide from a carbon dioxide source 5 via a gas supply device comprising a carbon dioxide booster 6 and a carbon dioxide pressure control 7.

If desired, carbon dioxide may be supplied into the mold 3 and used as a gas to produce counterpressure; alternatively, it may be supplied into a hopper 8 on the plasticizing cylinder 2 so that it is absorbed by a resin being supplied from the hopper 8 into the plasticizing cylinder 2. In this case, the carbon dioxide to be supplied into the plasticizing cylinder 2, the carbon dioxide to be supplied into the mold 3 and the carbon dioxide to be supplied into the hopper 8 are preferably adapted to be controllable independently in such terms as the start and stop of supply and the supply pressure.

The above plasticizing cylinder 2, carbon dioxide source 5, carbon dioxide booster 6 and carbon dioxide pressure control 7 are further described with reference to FIG. 2.

Figure 2:
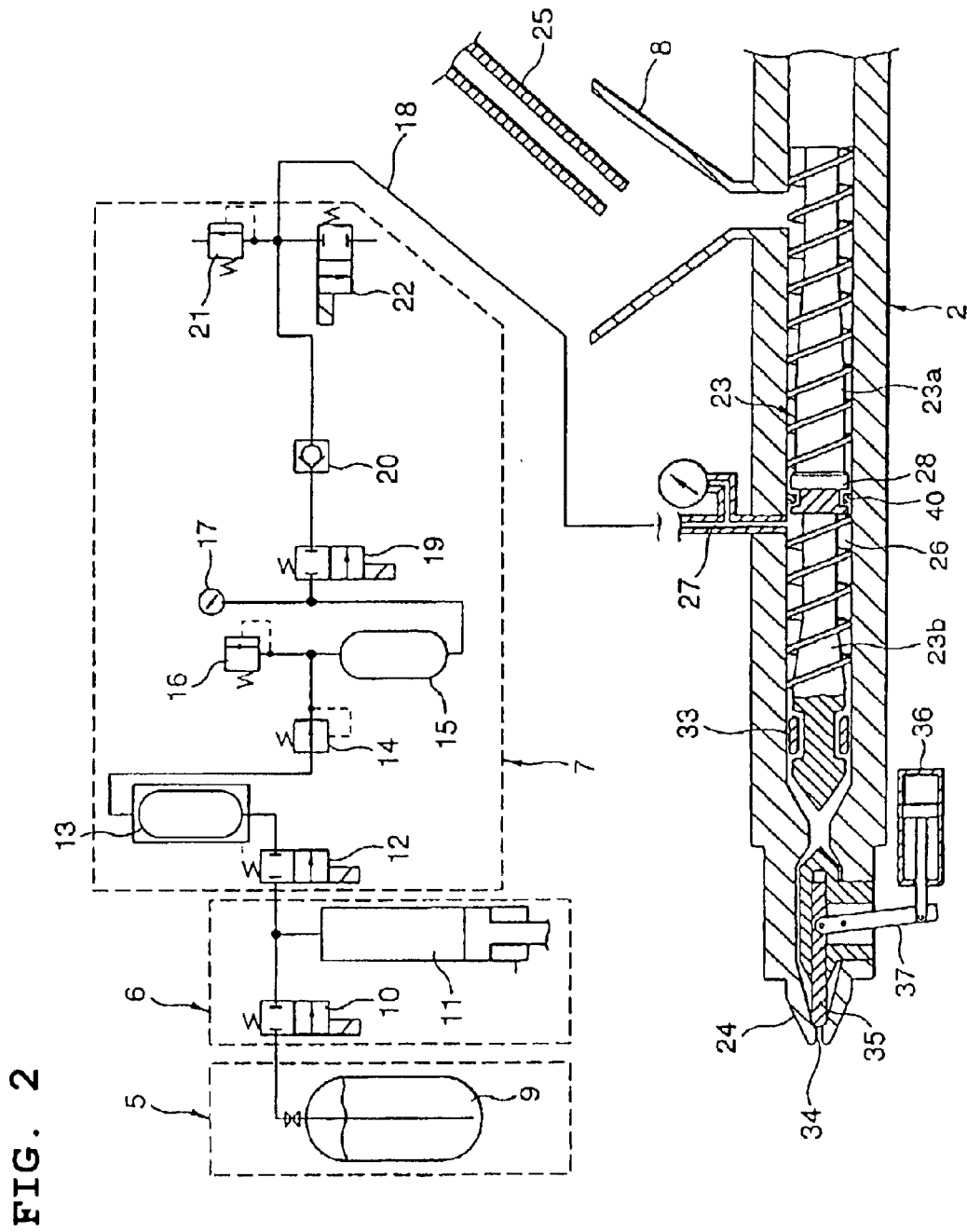
FIG. 2 is a diagram showing details of a gas supply device comprising the carbon dioxide source, the carbon dioxide booster and the carbon dioxide pressure control that are shown in FIG. 1 and a plasticizing cylinder portion.

As shown in FIG. 2, a liquefied carbon dioxide container 9 is used as the carbon dioxide source 5 in the case under consideration.

The carbon dioxide booster 6 is equipped with a liquefied carbon dioxide compressor 11 which pressurizes liquefied carbon dioxide to have an elevated pressure and the liquefied carbon dioxide container 9 is connected to the liquefied carbon dioxide compressor 11 via an electromagnetic on-off valve 10. The space between the carbon dioxide source 5 and the carbon dioxide booster 6 is held below the critical temperature of carbon dioxide (31.1° C.) in order to keep the carbon dioxide liquefied. The liquefied carbon dioxide supplied into the liquefied carbon dioxide compressor 11 from the liquefied carbon dioxide container 9 and which has been compressed there to have a higher pressure is sent to the carbon dioxide pressure control 7.

The liquefied carbon dioxide sent to the carbon dioxide pressure control 7 is supplied to a heater 13 via an electromagnetic on-off valve 12. The liquefied carbon dioxide supplied into the heater 13 is heated there to become a gas hotter than the critical temperature and the gas passes through a reducing valve 14 to be supplied into a main tank 15 for the plasticizing cylinder 2. The main tank 15 is connected to a relief valve 16 for escape of gas if the internal pressure becomes abnormally high and a meter 17 for checking the gas pressure in the main tank 15.

The above main tank 15 and the plasticizing cylinder 2 are connected by a gas supply pipe 18 which are equipped, in order from the main tank 15, with an electromagnetic on-off valve 19 and a check valve 20. Connected between the check valve 20 and the plasticizing cylinder 2 are a relief valve 21 and a valve 22 open to the atmosphere.

We now describe the procedure of operating the above-described gas supply device to supply carbon dioxide into a gas supply section 26 in the plasticizing cylinder 2.

First, the electromagnetic on-off valve 10 is opened with the electromagnetic on-off valves 19 and 20 closed, whereupon liquefied carbon dioxide is supplied from the liquefied carbon dioxide container 9 into the liquefied carbon dioxide compressor 11. Upon opening the electromagnetic on-off valve 12, the liquefied carbon dioxide gas compressed in the liquefied carbon dioxide compressor 11 is supplied into the heater 13 and warmed, then its pressure is reduced to the necessary level by the reducing valve 12 before it is stored in the main tank 15. After the pressurized gas with the necessary pressure has been stored in the main tank 15, the electromagnetic on-off valve 19 is opened and a predetermined pressure of carbon dioxide is supplied into the plasticizing cylinder 2 via the gas supply pipe 18.

Figure 7:
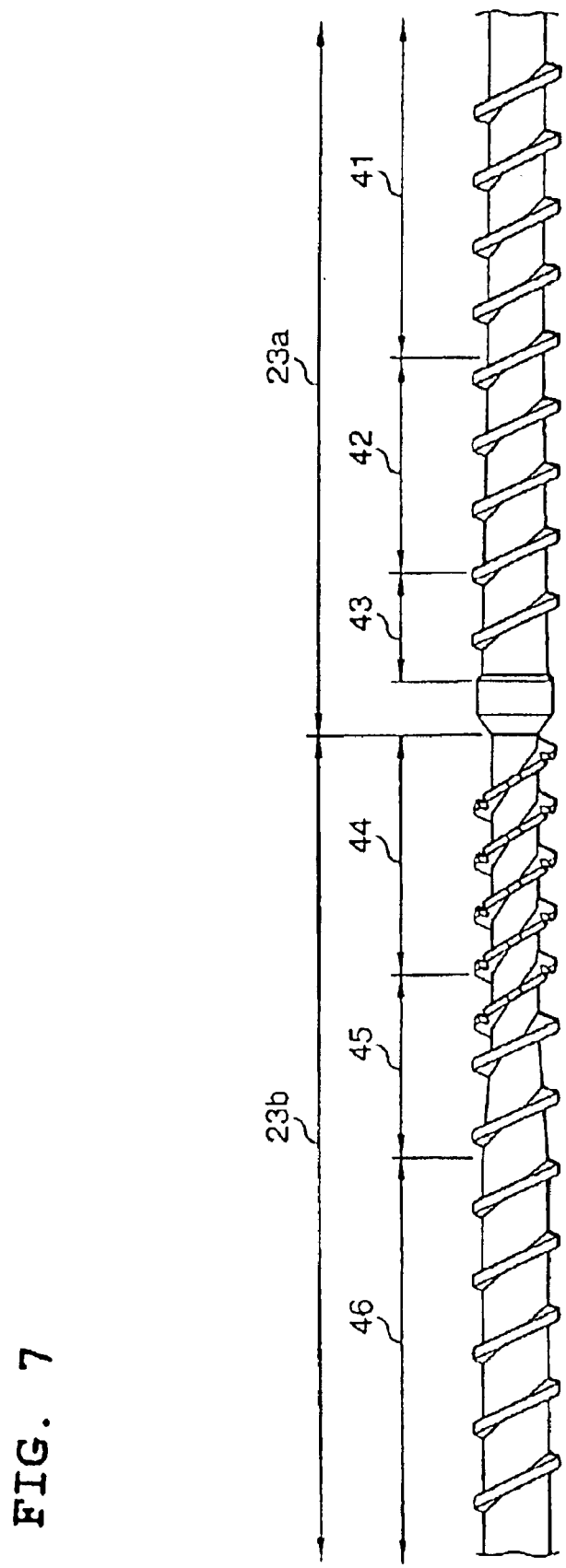
FIG. 7 is a diagram for illustrating the first and second stages of a screw.

The plasticizing cylinder 2 is equipped with a 2-stage type screw 23 in which a stage comprising, in order from the resin supply section toward the front end, a feed section, a compression section and a metering section is repeated twice in series and the first stage of the screw 23a is closer to the hopper 8 and the second stage of the screw 23b is closer to the nozzle portion 24. As shown in FIG. 7, the first stage of the screw 23a comprises a first feed section 41, a first compression section 42 and a first metering section 43 and similarly the second stage of the screw 23b comprises a second feed section 44, a second compression section 45 and a second metering section 46.

A resin metering unit 25 is connected to the hopper 8 on the plasticizing cylinder 2 and a metered and controlled quantity of resin is supplied into the hopper 8. By connecting the resin metering unit 25 to the hopper 8, there is provided another advantage in that the amount of resin supply is controlled to provide greater ease with which the molten resin can be transferred in a starved state through the gas supply section 26.

The gas supply section 26 is located in the feed section (vent portion) of the second stage of the screw 23b and a gas supply channel 27 is open to this gas supply section 26. The gas supply channel 27 is connected to the aforementioned gas supply pipe 18.

Figure 3:
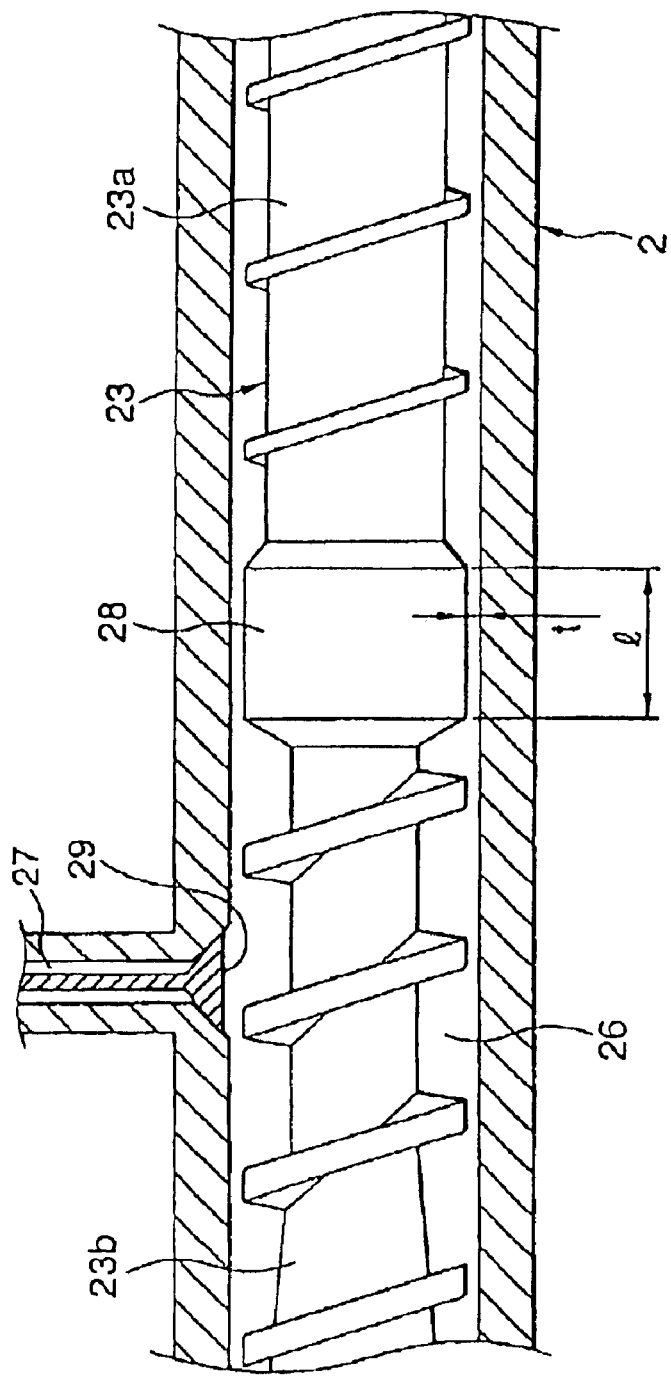
FIG. 3 shows in enlarged section an example of an area of the plasticizing cylinder near the gas supply section.

A flow control section 28 is provided between the gas supply section 26 and the first stage of the screw 23a. FIG. 3 shows enlarged an example of the flow control section. The flow control section 28 has a small clearance t from the inner surface of the barrel of the plasticizing cylinder 2 and controls the amount of the molten resin being transferred from the first stage of the screw 23a to ensure that the molten resin is transferred in a starved state through the gas supply section 26 and that the carbon dioxide supplied into the gas supply section 26 will not flow backward to the hopper 8. If a mechanism for preventing the back-flow of the molten resin is to be provided, it is installed between the flow control section 28 and the gas supply section 26 (see a back-flow preventing mechanism 40 in FIG. 2) and, depending on the screw design, the flow control section 28 may be omitted.

The clearance t between the flow control section 28 and the inner surface of the barrel of the plasticizing cylinder 2 is variable with the screw diameter but it is preferably about 0.1–1 mm, more preferably about 0.1–0.5 mm. The length 1 of the flow control section 28 is preferably about 5–200% of the screw diameter, more preferably about 10–100% of the screw diameter.

The clearance t and the length 1 are selected as appropriate for the melt viscosity of resin and the pressure of gas to be supplied. The lower the melt viscosity of the resin used and the higher the pressure of carbon dioxide to be supplied into the gas supply section 26, the smaller the clearance t and the greater the length 1. By adjusting these values, if the first stage of the screw 23a is filled with the resin, the carbon dioxide in the gas supply section 26 can be positively prevented from flowing backward to the hopper 8 during the molding operation. If desired, the temperature of the molten resin passing through the flow control section 28 may be lowered to enhance its viscosity and this is also effective in ensuring that the carbon dioxide supplied into the gas supply section 26 will not flow backward to the hopper 8.

Figure 8:
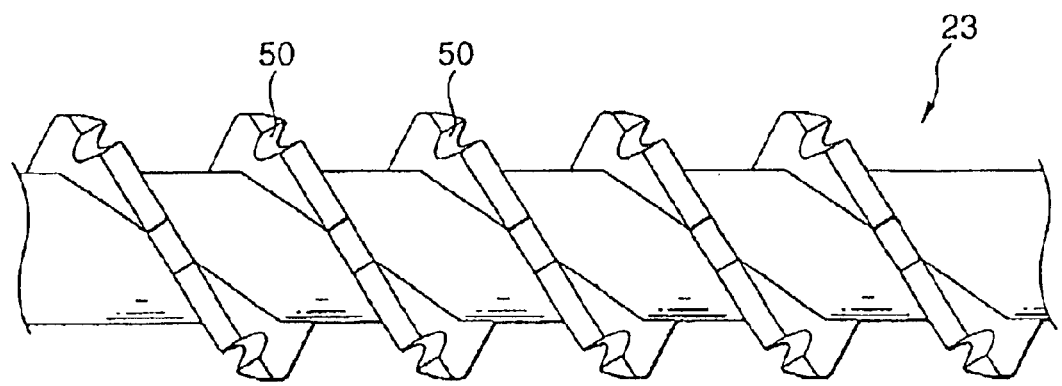
FIGS. 8(*a*) and 8(*b*) are diagrams showing an example of a notched screw.
Figure 8:
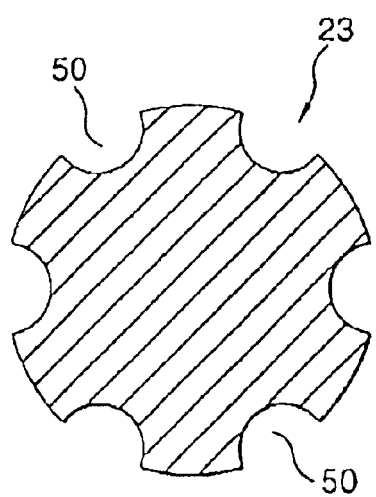

As shown in FIG. 7 and in FIGS. 8A and 8B, the screw flights in the second feed section of the screw 23 are provided with notches 50 for causing part of the molten resin to flow backward on the condition that a starved state is maintained in the second feed section, thereby promoting dissolution of the gas being supplied from the gas injection channel 27 into the molten resin. As the molten resin is supplied from the first stage of the screw 23 to the second feed section, it is fed fast and forward through the second feed section on account of the deep screw flights and the double flights with large pitch but, at the same time, part of the molten resin flows backward via the notches 50, thereby effecting adequate kneading. As a result, gas such as carbon dioxide that has been supplied from the gas injection channel 27 into the second feed section is dispersed more uniformly and its dissolution into the molten resin is promoted.

The shape of the above notches 50 is semicircular in the case under consideration but they may be triangular or rectangular. As already mentioned, the total area of the notches 50 is preferably from 1/50 to 1/2 of the total area of the screw flights in the second feed section and a more preferred range is from 1/20 to 1/3. It is also preferred that the notches 50 are distributed over all of the screw flights in the second feed section. In the case under consideration, the notches 50 are provided equidistantly in the helical direction of the screw flights.

Figure 4:
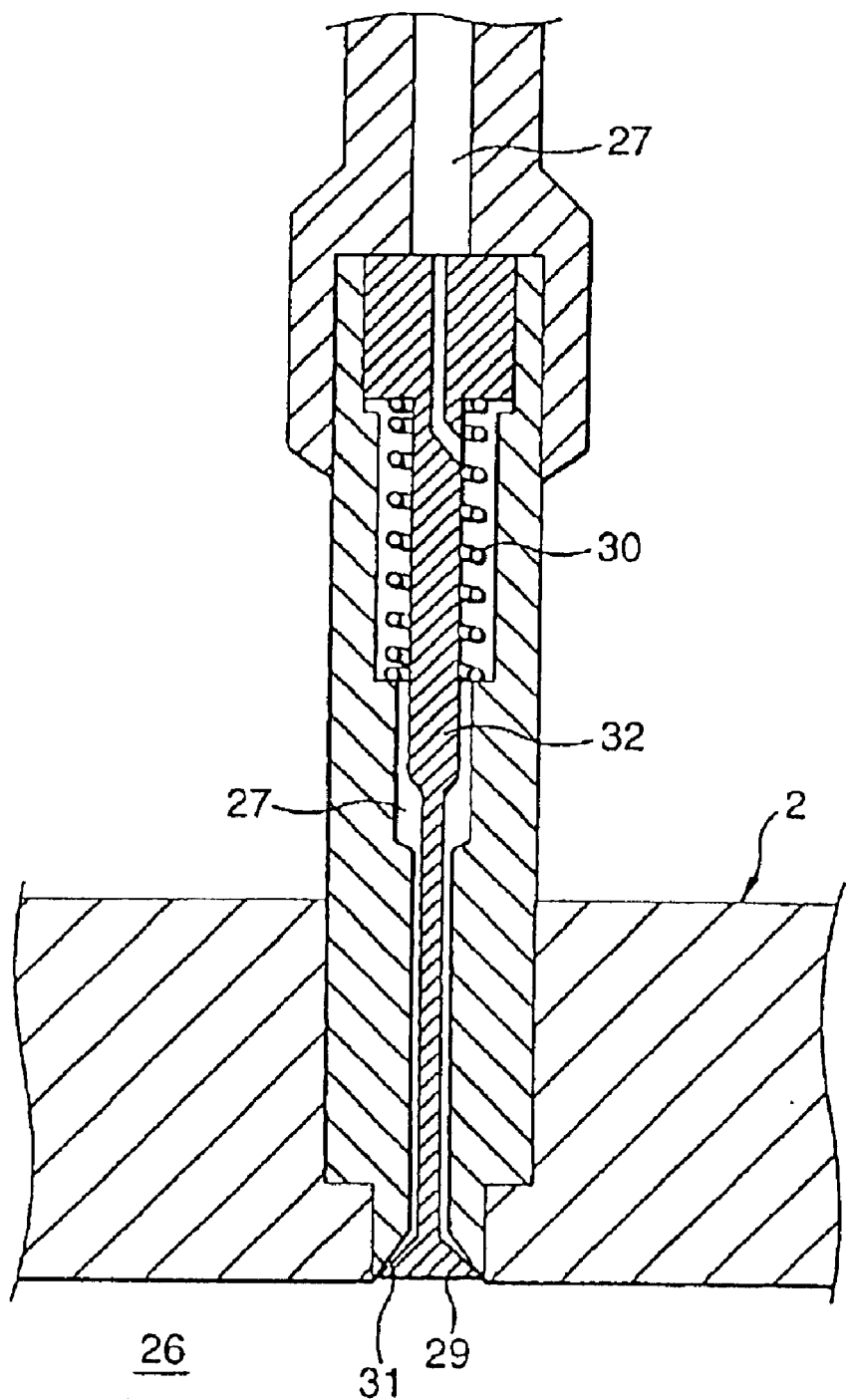
FIG. 4 shows in section an automatic on-off valve mechanism in the gas supply section.

To supply carbon dioxide into the gas supply section 26, the molten resin is transferred in a starved state through the gas supply section 26 by means of the above flow control section 28 and the empty space thus formed in the gas supply section 26 (the area not filled with the molten resin) is supplied with carbon dioxide via an automatic on-off valve 29 shown in FIG. 4.

As shown in FIG. 4, the automatic on-off valve 29 in the case under consideration comprises a mushroom valve which is urged outward of the injection cylinder 2 by means of a spring 30 so that it is pressed onto a valve seat 31.

To further explain, the above automatic on-off valve 29 is positioned at the distal end of the gas supply channel 27 and on the peripheral edge of the distal end of the gas supply channel 27, there is provided a valve seat 31 facing the back of the automatic on-off valve 29. A valve shaft 32 is connected to the back of the automatic on-off valve 29; this valve shaft 32 extends through the gas supply channel 27 with a clearance provided around it and it is urged outward of the plasticizing cylinder 2 by means of the spring 30.

When the pressure in the gas supply channel 27 is equal to the pressure in the gas supply section 26 of the plasticizing cylinder 2, the above automatic on-off valve 29 is pressed onto the valve seat 31 by the force of the spring 30 to close the gas supply channel 27; when carbon dioxide is supplied into the gas supply channel 27 until the pressure in the gas supply channel 27 becomes higher than the pressure in the gas supply section 26 of the plasticizing cylinder 2 so that the force exerted by the pressure of carbon dioxide exceeds the force of the spring 30, the automatic on-off valve 29 moves into the plasticizing cylinder 2 against the spring 30 to open the gas supply channel 27.

If the automatic on-off valve 29 using the above mushroom valve is employed to supply carbon dioxide, the gas supply channel 27 opens in a carbon dioxide supply mode in accordance with the flow of carbon dioxide to provide a comparatively large area of opening and, hence, the necessary amount of carbon dioxide can be supplied within a short time. On the other hand, when there is no flow of carbon dioxide, the gas supply channel 27 is closed automatically, so the molten resin will not flow backward into the gas supply channel 27. Furthermore, even in the case where carbon dioxide flows, any part of the molten resin that is about to get into the gas supply channel 27 will push the bottom of the automatic on-off valve 29 to close the gas supply channel 27 automatically, whereby the molten resin can be prevented from flowing backward.

In order to prevent the molten resin from convecting in the neighborhood of its distal end face (the face on the inside of the plasticizing cylinder 2), the above automatic on-off valve 29 is preferably positioned such that when it is open, its distal end face is substantially flush with the inner surface of the plasticizing cylinder 2. Specifically, the automatic on-off valve 29 is preferably such that when it is closed, the position of its distal end face is substantially equal to or recessed about 0.5 mm from the position of the inner surface of the plasticizing cylinder 2.

Figure 9:
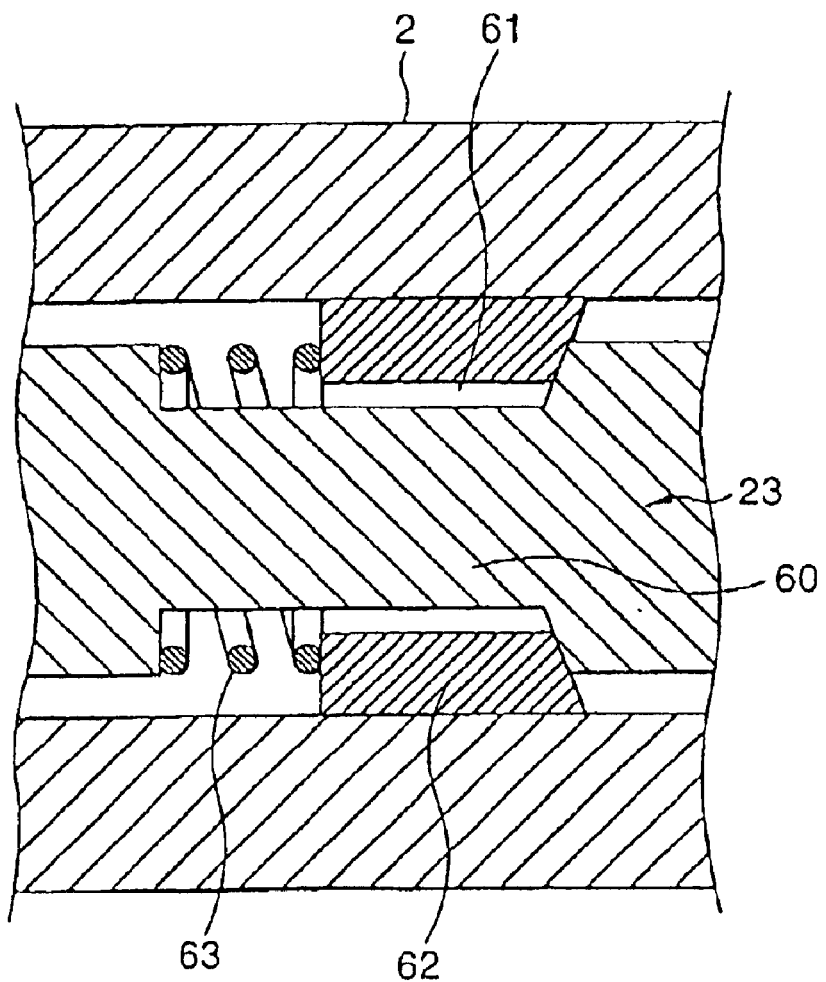
FIG. 9 shows in enlarged section a back-flow preventing mechanism provided at the front end of a screw.

As shown in FIG. 2, the front end portion of the screw 23 is provided with a back-flow preventing mechanism 33 for preventing the molten resin from flowing backward when it is being injected. The back-flow preventing mechanism 33 may be as shown in FIG. 9; a small-diameter portion 60 is formed in the front end portion of the screw 23 and an annular check ring 62 is inserted into the small-diameter portion 60, with a resin flow channel 61 left between the ring 62 and the outer peripheral surface of the small-diameter portion 60, in such a way that the ring 62 is capable of moving along the central axis of the screw 23, and a spring 63 is provided to press the check ring 62 toward the rear end (toward the hopper 8). The back-flow preventing mechanism 33 operates as follows: when the screw 23 is at rest, the pushing force of the spring 63 pushes the check ring 62 to move toward the rear end to close the resin flow channel;

when the screw 23 rotates in forward direction in the presence of the molten resin, the advancing force of the molten resin pushes the check ring 62 to move toward the front end against the spring 63, thereby opening the resin flow channel. The nozzle portion 24 is also provided with a needle valve 35 for opening or closing a nozzle hole 34. This needle valve 35 is provided within the nozzle portion 24 in such a way that it can move toward or away from the nozzle hole 34. When a drive rod 37 is tilted by a drive unit 36 such as a hydraulic cylinder, the needle valve 35 is moved back and forth and it closes the nozzle hole 34 when it advances whereas it opens the nozzle hole 34 when it retracts.

Providing the needle valve 35 of the above type to ensure that the nozzle hole 34 can be opened and closed offers the advantage that if plasticizing and metering operations are performed by exerting pressure (back pressure of the screw) on the front end portion of the screw 23 with the nozzle hole 34 kept closed, the molten resin with dissolved carbon dioxide that collects in the front end portion of the plasticizing cylinder 2 after metering can be prevented from expanding.

In the injection molding method of the invention, it is preferred to use the plasticizing cylinder 2 which is capable of opening and closing the nozzle hole 34; the mechanism for opening and closing the nozzle hole 34 is not limited to the above type which forces it to open and close mechanically and there may be used such a type that the nozzle hole 34 opens automatically when the pressure of the molten resin in the plasticizing cylinder 2, particularly the pressure of the molten resin at its front end, has reached a predetermined level. In other words, the injection molding machine to be used in the invention preferably employs the plasticizing cylinder 2 equipped with a valve nozzle that can be opened or closed.

While the above-described apparatus uses carbon dioxide as a gas, the injection molding method of the invention can be performed with the same apparatus even if gases other than carbon dioxide are used.

EXAMPLES

The following examples and comparative examples are provided for the purpose of further illustrating the present invention.

To begin with, the materials, the equipment and the method for measuring the quantity of carbon dioxide in molten resin that were used in the examples and comparative examples are described.

Resins

Rubber-reinforced polystyrene: A&M POLYSTYRENE-492, product of A&M Styrene Co.

Poly(methyl methacrylate) resin (PMMA): DELPET 70NHX, product of ASAHI KASEI CORP.

Carbon Dioxide

Carbon dioxide with a purity of at least 99% was used.

Injection Molding Machine

SG125M-HP of SUMITOMO HEAVY INDUSTRIES, LTD. was used as a base. This molding machine was of an in-line screw type and the screw was of a 2-stage type with L/P=23; the screw design had the construction shown in FIG. 2. The screw diameter was 32 mm; the depth of screw flights was 3.8 mm in the first feed section, 1.7 mm in the first metering section, 7 mm in the second feed section, and 1.9 mm in the second metering section. The second feed section had double flights. Two types of screw were used, one containing notches and the other containing no notches. The notches were semicircular with a radius of 3 mm and four notches were provided equidistantly per rotation. A cylindrical flow control section 20 mm wide was provided in the first stage of the screw and the clearance from the inner surface of the cylinder was adjusted to 0.25 mm. The gas supply section had the structure shown in FIG. 3 and a mushroom valve of the type shown in FIG. 4 was installed as an automatic on-off valve. The part of the mushroom valve which would contact the valve seat had a diameter of 4.6 mm and this mushroom valve was closed with a spring by a force of 300 g. The nozzle portion was designed to have the mechanical opening/closing mechanism shown in FIG. 2. Although not shown, a pressure sensor for measuring the pressure of molten resin or gas was attached to the inner surface of the cylinder on the side opposite the side where the gas supply channel was open to the gas supply section. NP465XL of DAINISCO Co., Ltd. was used as the pressure sensor.

Setting the Injection Cylinder Temperature

The temperature settings of the injection cylinder during injection molding were 200 and 210° C. in the case where the resin used was rubber-reinforced polystyrene and 240° C. in the case of a poly(methyl methacrylate) resin.

Measuring the Amount of Carbon Dioxide in Molten Resins

The amount of carbon dioxide dissolved in molten resin was measured from the decrease in the weight of a molded article after molding. Specifically, the weight of a molded article was measured immediately after molding; thereafter, the molded article was left to stand in the atmosphere for about 24 hours, then left to stand in a vacuum dryer at 80° C. for 48 hours and another weight measurement was made; the difference between the weights measured before and after standing was used as the amount of carbon dioxide contained in the molten resin.

Mold

A mold for shaping a rectangular flat plate 2 mm thick, 120 mm long and 60 mm wide was used.

Reference Example 1

A screw containing notches in the second feed section and a rubber reinforced polystyrene resin were used; the temperature of the plasticizing cylinder was set at 210° C. and molding was performed with the screw rotating at 150 rpm and with a molding cycle time of 40 seconds.

Using the gas supply device shown in FIG. 2, the pressure of carbon dioxide to be supplied into the gas supply section of the plasticizing cylinder was varied and injection molding was performed with the pressure at the front end of the screw being made equal to the pressure of carbon dioxide being supplied into the vent portion, and the amount of carbon dioxide in the molten resin was measured. The result is shown in FIG. 5.

Figure 5:
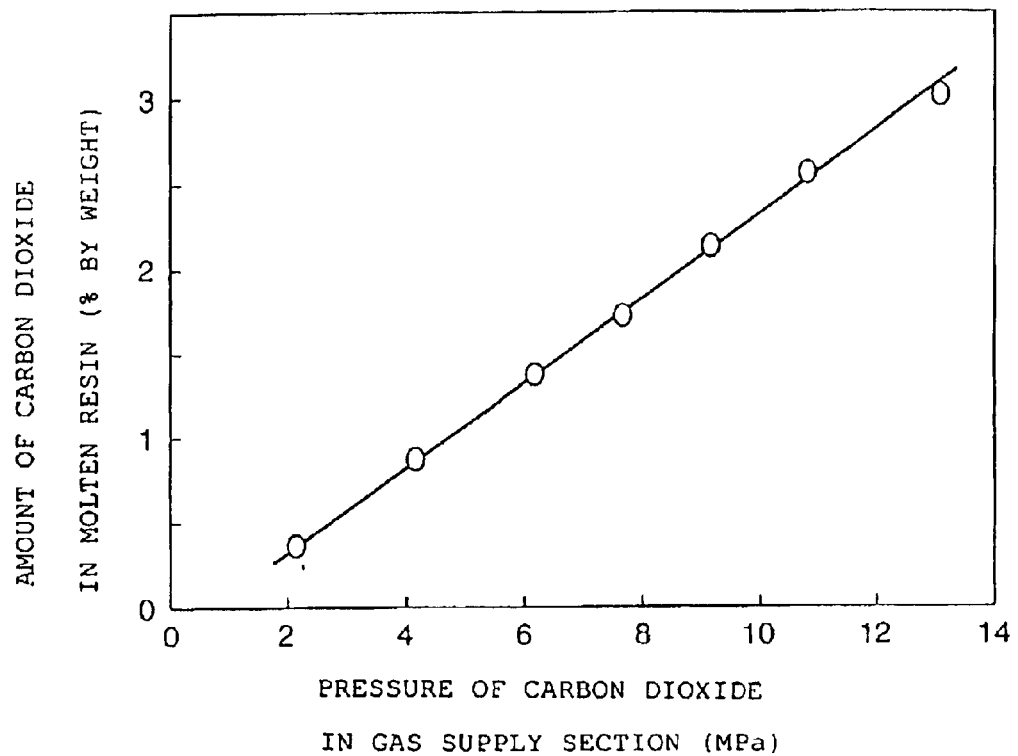
FIG. 5 is a graph showing the relationship between the pressure of carbon dioxide in the gas supply section and the amount of carbon dioxide dissolved in molten resin.

As FIG. 5 shows, the pressure of carbon dioxide supplied to the gas supply section is proportional to the amount of carbon dioxide dissolved in the molten resin and it is seen that the amount of carbon dioxide dissolved in the molten resin can be controlled by the pressure of carbon dioxide.

Reference Example 2

Without supplying gas but with the nozzle hole closed, the actions of plasticizing and purging a resin were repeated with a screw stroke of 50 mm.

Figure 6:
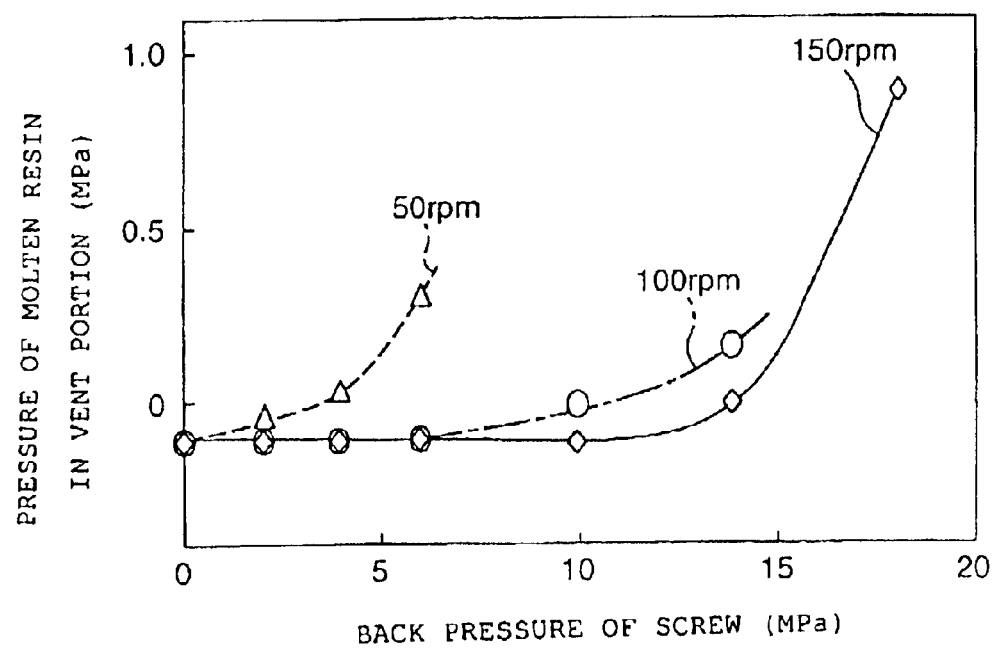
FIG. 6 is a graph showing the relationship between the pressure at the front end of a screw and the pressure of the molten resin in the gas supply section.

While the screw was rotating at 50, 100 or 150 rpm, the pressure at its front end was varied and the pressure of the molten resin that was exerted on the gas supply section by each of the pressures at the front end of the screw was measured with the pressure sensor and the result is shown in FIG. 6.

As FIG. 6 shows, if the pressure at the front end of the screw is increased with the rpm of the screw held constant, the pressure of the molten resin comes to be detected in the gas supply section when the pressure at the front end of the screw exceeds a certain level. When the pressure at the front end of the screw exceeded 14 MPa while the screw was rotating at 150 rpm, a molten resin's pressure greater than 0 MPa was detected, indicating that the gas supply section was filled with the molten resin and that it could not be transferred in a starved state.

Example 1

A screw containing notches in the second feed section and a rubber reinforced polystyrene resin were used; the temperature of the plasticizing cylinder was set at 210° C. and 30 purging actions were performed with the screw rotating at 150 rpm, with a pressure of 10 MPa being exerted at the front end of the screw and with 10 MPa of carbon dioxide being supplied into the gas supply section. The strand from the nozzle portion foamed finely but it did not break nor was heard any sound of bursting bubbles; it was therefore speculated that no large bubbles existed in the molten resin.

Subsequently, a mold with a surface temperature of 40° C. the cavity of which had been filled with 8 MPa of carbon dioxide was filled with the resin in 0.6 seconds, subjected to dwelling for 3 seconds with the pressure of the molten resin in the plasticizing cylinder maintained at 110 MPa, and cooled for 20 seconds. The cavity filling carbon dioxide was released to the atmosphere simultaneously with the end of the resin filling.

Fifty shots were molded with a cycle time of 40 seconds and yet the plasticization time was 6.5 seconds with a fluctuation of no more than 0.3 seconds. The moldings experienced no blistering and they had no foam patterns on the surfaces; they had a good appearance with no cells found in the interior. The amount of carbon dioxide dissolved in the molten resin as obtained from the decrease in the weight of the moldings was 2.3 wt %.

Example 2

A screw containing notches in the second feed section and a rubber reinforced polystyrene resin were used; the temperature of the plasticizing cylinder was set at 210° C. and purging actions were performed with the screw rotating at 150 rpm and with a pressure of 18 MPa being exerted at the front end of the screw. In this case, when no carbon dioxide was supplied into the gas supply section, a pressure of 0.8 MPa was detected for the molten resin, indicating that the gas supply section was filled with the resin. In this state, 10 MPa of carbon dioxide was supplied into the gas supply section and purging and molding were performed as in Example 1.

In each purging action, the strand from the nozzle portion foamed finely but it did not break nor was heard any sound of bursting bubbles; it was therefore speculated that no large bubbles existed in the molten resin.

Fifty shots were molded with a cycle time of 40 seconds and yet the plasticization time was 8.3 seconds with a fluctuation of no more than 0.4 seconds. The moldings experienced no blistering and they had no foam patterns on the surfaces; they had a good appearance with no cells found in the interior. The amount of carbon dioxide dissolved in the molten resin as obtained from the decrease in the weight of the moldings was 2.0 wt %.

Comparative Example 1

A screw containing notches in the second feed section and a rubber reinforced polystyrene resin were used; the temperature of the plasticizing cylinder was set at 210° C. and purging and molding were performed as in Example 2, except that the pressure at the front end of the screw was adjusted to 9 MPa.

In the purging action, the strand from the nozzle portion foamed finely and broke; hence, no continuous strand was obtained and sound of bursting bubbles was heard, indicating that large bubbles existed in the molten resin. The plasticization time was largely variable between about 3 and 6 seconds and blistering occasionally occurred in the moldings.

Comparative Example 2

A screw containing notches in the second feed section and a rubber reinforced polystyrene resin were used; the temperature of the plasticizing cylinder was set at 210° C., the screw was rotating at 150 rpm and a pressure of 30 MPa being exerted at the front end of the screw. When no carbon dioxide was supplied into the gas supply section, a pressure of 12 MPa was detected for the molten resin, indicating that the gas supply section was filled with the molten resin.

In this state, 10 MPa of carbon dioxide was supplied into the gas supply section and purging and molding were performed as in Example 2.

In each purging action, the strand from the nozzle portion did not foam but remained clear; when the molten resin was left to stand, slight foaming occurred to such an extent that a few cells formed in the interior. This indicated that carbon dioxide hardly dissolved in the molten resin.

Molding was performed without pressurizing the cavity with carbon dioxide. The moldings were clear and had no foam patterns on the surface. The amount of carbon dioxide dissolved in the molten resin as obtained from the decrease in the weight of the moldings was no more than 0.1 wt %.

Example 3

With the temperature of the injection cylinder set at 210° C., injection molding was performed using a rubber reinforced polystyrene. The pressure of carbon dioxide being supplied to the gas supply section was held at 9 MPa, the screw was rotating at 150 rpm, a pressure of 11 MPa was exerted at the front end of the screw, and a counterpressure produced by 7 MPa of carbon dioxide was applied in order to prevent foaming from occurring while the mold was in the process of filling with the molten resin. Using two types of screw, one containing notches in the screw flights in the second feed section and the other containing no notches, molding was performed with the molding cycle time varied over the range of from 26 to 100 seconds in each case.

From the moldings obtained, the amount of carbon dioxide dissolved in the molten resin was measured. The result is shown in FIG. 10.

Figure 10:
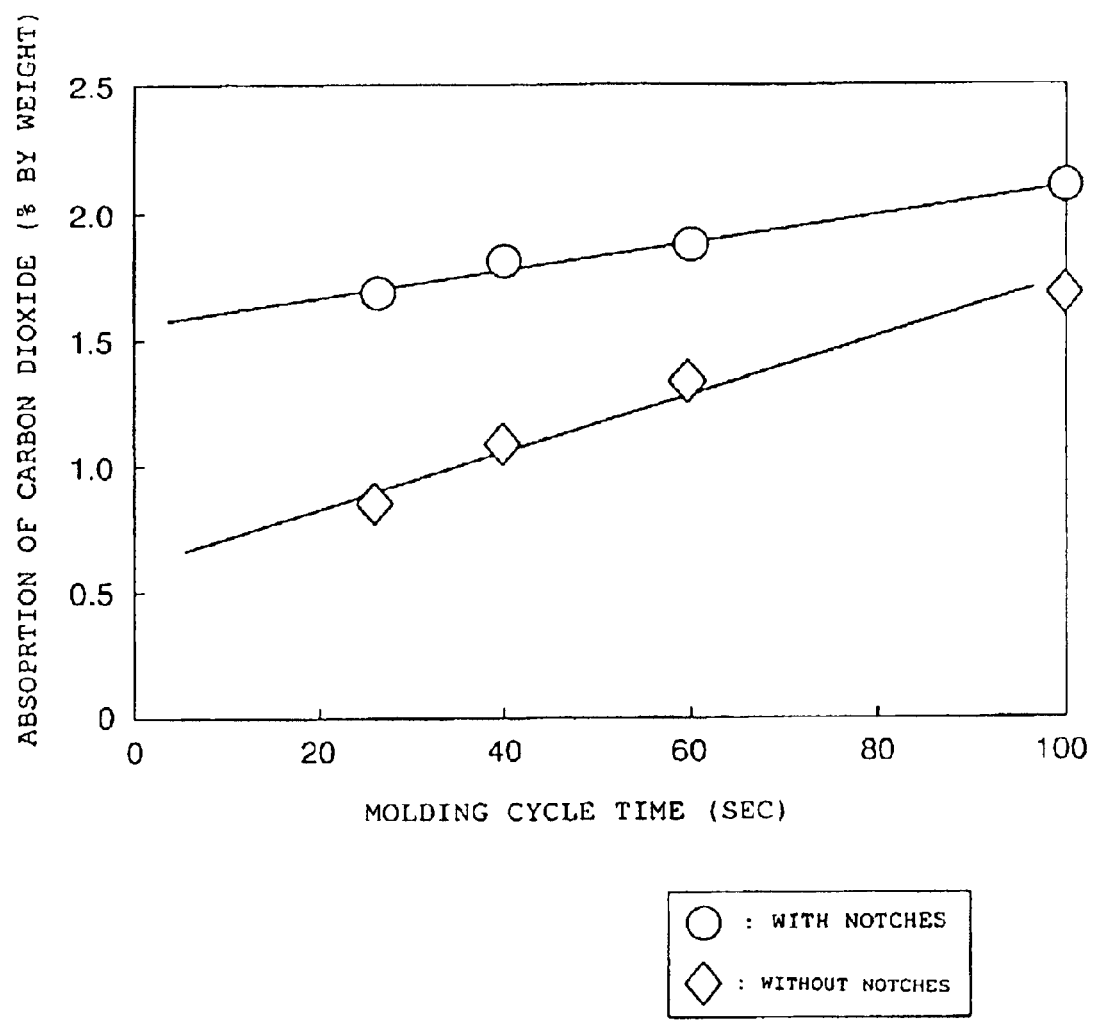
FIG. 10 is a graph showing the relationship between the molding cycle time and the amount of carbon dioxide absorbed in Example 3.

As FIG. 10 shows, when the screw containing notches in the screw flights in the second feed section was used, the dissolution of carbon dioxide increased by a factor of 1.5 compared to the case of using the screw containing no such notches, indicating that an increased amount of carbon oxide could be dissolved. In addition, when the screw containing notches in the screw flights in the second feed section was used, the fluctuation in the amount of dissolved carbon dioxide due to the fluctuation in the molding cycle time was small compared to the case of using the screw containing no such notches, indicating the possibility of performing more consistent molding.

Example 4

The amount of carbon dioxide dissolved in the molten resin was measured as in Example 3, except that the resin to be used was changed to PMMA. The experiment was done using a screw containing notches in the screw flights in the second feed section and a screw containing no such notches.

Figure 11:
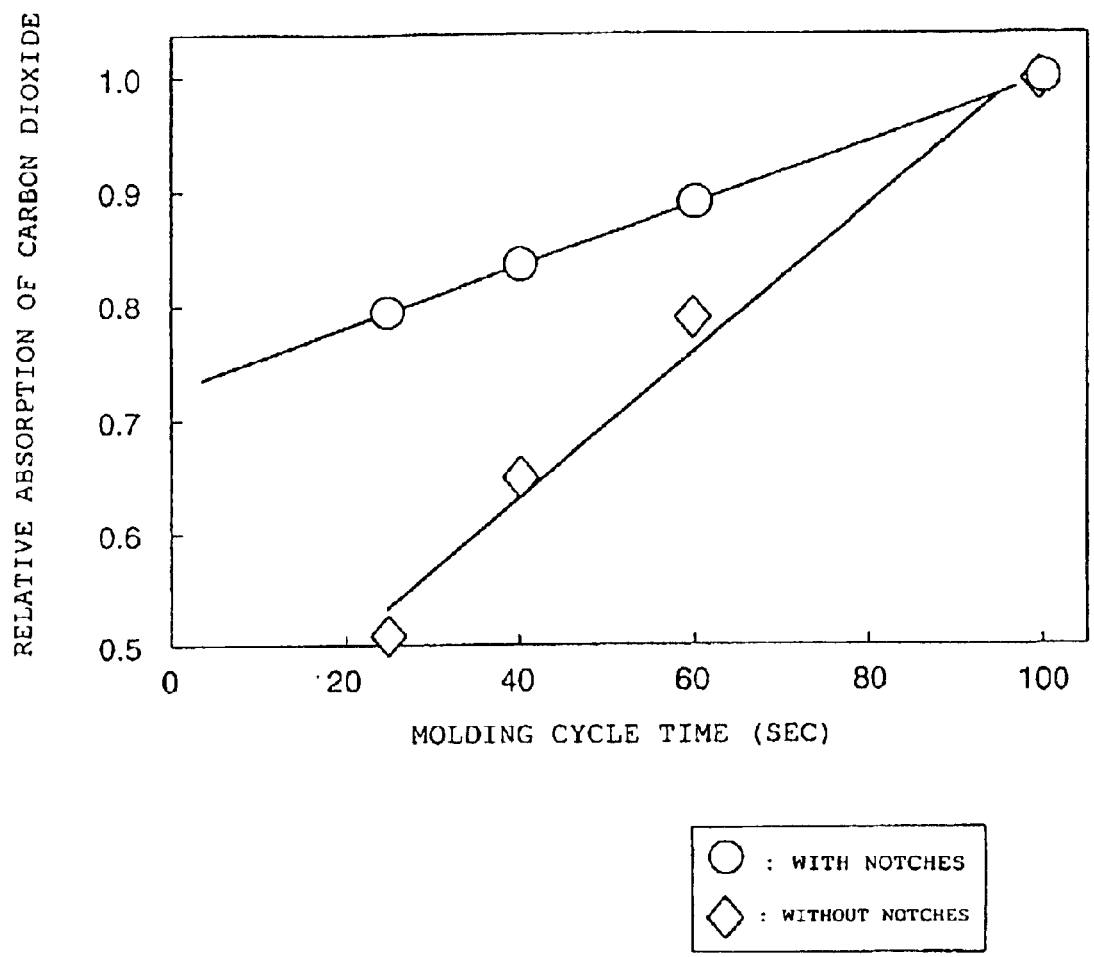
FIG. 11 is a graph showing the relationship between the molding cycle time and the amount of carbon dioxide absorbed in Example 4.

The result is shown in FIG. 11. Like FIG. 10, FIG. 11 shows the relationship between the molding cycle time and the amount of carbon dioxide dissolved in the molten resin, provided that the vertical axis plots the amount of carbon dioxide for each molding cycle time in terms of ratio, with the amount of carbon dioxide being taken as unity for the case where the molding cycle time was 100 seconds.

As FIG. 11 shows, when the screw containing notches in the screw flights in the second feed section was used, more carbon dioxide could be dissolved than in the case of using the screw containing no such notches. In addition, when the screw containing notches in the screw flights in the second feed section was used, the fluctuation in the amount of dissolved carbon dioxide due to the fluctuation in the molding cycle time was small compared to the case of using the screw containing no such notches, indicating the possibility of performing more consistent molding.

Industrial Applicability

The present invention is as described on the foregoing pages; the necessary amount of gas can be dissolved in molten resin with good reproducibility in a quantitative manner; on account of the notches made in the screw, gas of low enough pressure can be dissolved in a greater amount in the molten resin to perform injection molding; as a result, injection molding which has gas dissolved in the molten resin to improve its flowability, as well as foam molding using a dissolved gas can be performed efficiently. In addition, the fluctuation in the amount of dissolved gas that accompanies the fluctuation in the molding cycle time can be sufficiently reduced to enable consistent injection molding.

What is claimed is:

1. An injection molding method comprising supplying a gas into a molten resin in a plasticizing cylinder and injecting the molten resin having the gas dissolved therein, wherein when the resin is being plasticized, a gas space with a predetermined gas pressure is formed within the plasticizing cylinder in a gas supply section and the pressure at the front end of a screw is adjusted to be at least equal to the gas pressure in the gas space and within a range where the gas space can be maintained within the plasticizing cylinder in the gas supply section, wherein the plasticizing cylinder is equipped with a multi-stage type screw comprising a front end side screw stage having screw flights wherein notches are formed in at least one of said screw flights and the gas and the molten resin are kneaded to dissolve the gas into the molten resin while part of the molten resin is caused to flow backward by means of said notches, and wherein the gas pressure in the gas space is kept at a predetermined level to control the gas dissolution amount.

2. The injection molding method according to claim 1, wherein the gas pressure in the gas space formed in the gas supply section is detected and the pressure at the front end of the screw is controlled on the basis of this gas pressure.

3. The injection molding method according to claim 1, wherein the molten resin is transferred in a starved state within the gas supply section.

4. The injection molding method according to claim 1, wherein the pressure at the front end of the screw exerted during plasticization is also retained during the screw shutdown period from the end of plasticization to the start of injection.

5. The injection molding method according to claim 1, wherein the gas is carbon dioxide.

6. The injection molding method according to claim 1, wherein the plasticizing cylinder is equipped with a multi-stage type screw in which a stage comprising, in the following order from the resin supply section side toward the front end side of the screw, a feed section, a compression section and a metering section is repeated a plurality of times in series, and the gas supply section is located within the feed section of the front end side screw stage.

7. The injection molding method according to claim 6, wherein a flow control section presenting high resistance to the flow of the molten resin is provided in the metering section of the rear end side screw stage of the plasticizing cylinder.

8. The injection molding method according to claim 6, wherein the plasticizing cylinder is equipped with a mechanism for preventing a back-flow of the molten resin in the metering section of the rear end side screw stage.

9. The injection molding method according to claim 1, wherein the gas supply into the plasticizing cylinder in the gas supply section is effected via an automatic on-off valve which is pressed by a spring onto a valve seat provided on the perimeter of an opening in a gas supply channel that extends into the plasticizing cylinder and which, when gas is supplied into the gas supply channel, is pushed against the spring by the pressure difference between the supply pressure and the pressure within the cylinder in the gas supply section and moved into the plasticizing cylinder to open the gas supply channel.

10. An injection molding apparatus which comprises a plasticizing cylinder and a gas supply device for supplying a gas into a molten resin in the plasticizing cylinder and which injects the molten resin having the gas dissolved therein, wherein said plasticizing cylinder has a multi-stage type screw in which a stage comprising, in the following order from the rear end side toward the front end side in the direction of injection, a feed section, a compression section and a metering section is repeated a plurality of times in series, and which is also equipped with a gas supply channel open to the feed section of the front end side screw stage, wherein said gas supply device is connected to the gas supply channel, and wherein notches are in at least one screw flight in the feed section of the front end side screw stage.

11. The injection molding apparatus according to claim 10, further comprising a pressure sensor for detecting the pressure of the gas supplied into the plasticizing cylinder via the gas supply channel and a control unit for controlling the pressure at the front end of the screw on the basis of the pressure as detected with said sensor.

12. The injection molding apparatus according to claim 10, further comprising an automatic on-off valve, which is pressed by a spring onto a valve seat provided on the perimeter of an opening in the gas supply channel that extends into the plasticizing cylinder and which, when gas is supplied into the gas supply channel, is pushed against the spring by the pressure difference between the supply pressure and the pressure within the cylinder in the gas supply section and moved into the plasticizing cylinder to open the gas supply channel.

13. The injection molding apparatus according to claim 10, wherein a flow control section presenting high resistance to the flow of the molten resin is provided in the metering section of the rear end side screw stage.

14. The injection molding method according to claim 1, wherein the total area of the notches accounts for $1/50-1/2$ of the total area of the screw flights, wherein the area of each notch and that of each screw flight are based on the area of projection in the direction of the central axis of the screw.

15. The injection molding apparatus according to claim 10, wherein the total area of the notches accounts for $1/50-1/2$ of the total area of the screw flights, wherein the area of each notch and that of each screw flight are based on the area of projection in the direction of the central axis of the screw.

* * * * *